United States Patent [19]
Campbell

[11] 3,869,433

[45] Mar. 4, 1975

[54] ARYLENE SULFIDE POLYMERS

[75] Inventor: Robert W. Campbell, Bartlesville, Okla.

[73] Assignee: Phillips Petroleum Company, Bartlesville, Okla.

[22] Filed: Nov. 19, 1973

[21] Appl. No.: 416,772

[52] U.S. Cl.................................. 260/79.1, 260/79
[51] Int. Cl............................................ C08g 23/00
[58] Field of Search............................ 260/79, 79.1

[56] References Cited
UNITED STATES PATENTS 3,538,166  11/1970  Campbell et al............... 260/609 E
3,763,124  10/1973  Edmonds, Jr......................... 260/79

Primary Examiner—Melvyn I. Marquis

[57] ABSTRACT

A method of producing arylene sulfide polymers employing (1) polyhalo-substituted aromatic compounds; (2) an alkali metal bisulfide selected from lithium, sodium, potassium, rubidium, and cesium bisulfides, (3) bases selected from the hydroxides of magnesium, calcium, strontium and barium and the carbonates of sodium, potassium, rubidium and cesium; and, (4) organic amides.

18 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one alkali metal bisulfide selected from lithium, sodium, potassium, rubidium, and cesium bisulfides, at least one base selected from the hydroxides of magnesium, calcium, strontium and barium and the carbonates of sodium, potassium, rubidium and cesium and at least one organic amide are contacted. Use of the base results in higher yields of the polymer than are obtained in the absence of said base.

The polyhalo-substituted aromatic compounds which can be employed in the method of this invention are compounds in which the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. Mixtures of polyhalo-substituted aromatic compounds such as dihalobenzenes can be used, for example, a mixture comprising at least one m-dihalobenzene and at least one p-dihalobenzene.

Bases which can be employed in the method of this invention include magnesium hydroxide, calcium hydroxide, strontium hydroxide, barium hydroxide, sodium carbonate, potassium carbonate, rubidium carbonate, cesium carbonate, and mixtures thereof. If desired, the hydroxy can be produced in situ by the reaction of the corresponding oxide with water.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, $\epsilon$-caprolactam, N-methyl-$\epsilon$-caprolactam, N,N'-ethylenedi-2-pyrrolidone, hexamethylphosphoramide, tetramethylurea, and the like and mixtures thereof.

Alkali metal bisulfides which can be used in the process of this invention include the bisulfides of lithium, sodium, potassium, rubidium, cesium and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the alkali metal bisulfide, the base and the organic amide or which can be present in a composite formed from the alkali metal bisulfide, the base and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the alkali metal bisulfide, the base, and the organic amide is maintained at polymerization conditions to produce the arylene sulfide polymer.

The ratio of reactants can vary considerably but about 0.9 to about 2, and preferably about 0.95 to about 1.2, gram-moles of the polyhalo-substituted aromatic compound will generally be employed per gram-mole of alkali metal bisulfide. The base generally will be employed in an amount within the range of from about 0.3 to 4, and preferably from about 0.4 to about 2, gram-equivalents per gram-mole of alkali metal bisulfide. As used herein, one gram-equivalent of the hydroxides of magnesium, calcium, strontium and barium represents the same amount as one-half gram-mole of these substances, whereas for the carbonates of sodium, potassium, rubidium, and cesium, the amount represented by one gram-equivalent is considered to be the same as that represented by one gram-mole.

The amount of organic amide employed can also vary over a wide range but will generally be within the range of from about 100 grams to about 2,500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be secured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

The foregoing statments are based upon the following examples.

EXAMPLES

In the following examples, values for glass transition temperature, (Tg), and crystalline melting point, (Tm), were determined by differential thermal analysis. Values for polymer-melt temperature, (PMT), were determined by placing the polymer sample on a heated bar having a temperature gradient. Values for inherent viscosity were determined at 206° C. in 1-chloronaphthalene at a polymer concentration of 0.4 g/100 ml solution.

EXAMPLE I

This example illustrates the production of poly(p-phenylene sulfide) through use of sodium bisulfide and sodium carbonate.

To a stirred 1-liter autoclave were charged 83.6 g. (1.0 gram-mole, 67% assay) NaSH, 106.0 g (1.0 gram-mole) of sodium carbonate, 276.7 g of N-methyl-2-pyrrolidone and 2.4 g of water. The mixture was heated under a slow nitrogen flush to 200° C. in 2hours. The distillate (33 ml) contained 27.3 g of water. The reactor was cooled to 175° C. and a solution of 149.9 g (1.02 gram-moles) of 1,4-dichlorobenzene in 50 g of N-methyl-2-pyrrolidone was introduced into the autoclave. The autoclave was closed under 20 psig nitrogen pressure and heated to 245° C. in 15 minutes. After 3 hours at 245° C. and a pressure of 130 to 430 psig, the reactor was cooled to room temperature. The product was a yellow cake.

The product was washed five times with 1-liter portions of hot water and was dried at 80° C. in a vacuum oven. Poly(p-phenylene sulfide) in the amount of 92.5 g (85.5% yield) was recovered and had an inherent viscosity of 0.03 and a PMT of 253° C.

EXAMPLE II

This example illustrates the production of poly(p-phenylene sulfide) through use of sodium bisulfide and sodium carbonate in proportions different from the proportions of Example I.

To a stirred 1-liter autoclave were charged 83.6 g. (1.0 gram-mole, 67% assay) of NaSH, 53.0 g (0.5 gram-mole) of sodium carbonate, 276.7 g of N-methyl-2-pyrrolidone and 2.4 g of water. Dehydration for one hour, forty minutes to 198° C. yielded 35 ml of liquid containing 29.4 g of water. 1,4-Dichlorobenzene was charged as in Example I and the polymerization was conducted similarly but at a pressure of 140–475 psig.

The product was a dark brown cake which after five washings in 1-liter portions of hot water and drying in a vacuum oven at 80°C., provided poly(p-phenylene sulfide) in a yield of 89.9% (97.3 g), with an inherent viscosity of 0.01 and a PMT of 216° C.

EXAMPLE III

The following example illustrates the production of poly(p-phenylene sulfide) through use of sodium bisulfide and potassium carbonate.

To a stirred 1-liter autoclave was charged 83.6 g (1.0 gram-mole, 67% assay), NaSH, 138.2 g (1.0 gram-mole) $K_2CO_3$, 276.7 g of N-methyl-2-pyrrolidone and 2.4 g of water. Dehydration for 1 hour, 40 minutes yielded 30 ml of liquid containing 26.4 g of water.

1,4-Dichlorobenzene was charged as in Example I and the polymerization was conducted as in Example I at a pressure of 130 to 360 psig. The product was a gray, dry solid. It was washed five times with 1-liter portions of water and dried at 80° C. in a vacuum oven. The yield was 101.7 g (94%) of poly(p-phenylene sulfide) having an inherent viscosity of 0.06 and a PMT of 263° C.

EXAMPLE IV

Under conditions otherwise comparable to those of Example III, the use of ½ gram-mole of $K_2CO_3$ produced 92.1 g (85.1% yield) poly(p-phenylene sulfide) having an inherent viscosity of 0.06 and a PMT of 263° C.

EXAMPLE V

Under conditions comparable to those of Example IV, the use of 326.7 g N-methyl-2-pyrrolidone, 2.4 g water, 1 gram-mole NaSH, 1 gram-mole $Li_2CO_3$, and 1.02 gram-moles of 1,4-dichlorobenzene, dehydration and polymerization at 120–375 psig yielded 38.8 g (37% yield) of poly(p-phenylene sulfide) having an inherent viscosity of 0.01 and a PMT of 255°C. Thus, the use of $Li_2CO_3$, outside the scope of this invention, provided no improvement in the yield of poly(p-phenylene sulfide), as can be seen by comparison with the yield of polymer obtained in Example IX

EXAMPLE VI

This example demonstrates the use of $Ca(OH)_2$ as a base. To a stirred autoclave were charged 83.6 g (1.0 gram-mole, 67% assay) of NaSH, 37.05 g (0.5 gram-mole) of $Ca(OH)_2$ and 276.7 g of N-methyl-2-pyrrolidone. The mixture was heated to 199° C. under a slow $N_2$ flush in 1 hour and 50 minutes. The distillate (26 ml) contained 23.7 g of water.

A solution of 149.9 g (1.02 gram-moles) of 1,4-dichlorobenzene in 50 g of N-methyl-2-pyrrolidone was added and the mixture was heated at 245° C. for 3 hours at a pressure of 80–135 psig. The reactor was cooled to room temperature and the product was washed three times with 1-liter portions of cold water and 8 times with 1-liter portions of hot water. The poly(p-phenylene sulfide) product was dried in a vacuum oven at 80° C. The yield was 62% (67.0 g) including ash, or 49.4%, ash excluded, and the product had a Tg of 75° C. and a Tm of 277° C.

EXAMPLE VII

This example demonstrates the use of CaO, with $Ca(OH)_2$ produced in situ as the base.

To a stirred 1-liter autoclave were charged 83.6 g (1.0 gram-mole, 67% assay) NaSH, 28.04 g (0.50 gram-mole) of calcium oxide and 276.7 g of N-methyl-2-pyrrolidone. Dehydration for two hours while heating to 205° C. yielded 19 ml of distillate containing 16.7 g of water. After the addition of 149.9 g (1.02 gram-moles) 1,4-dichlorobenzene in 50 g N-methyl-2-pyrrolidone, polymerization was conducted as in Example VI at a pressure of 40 to 105 psig to yield a yellow, semi-solid product. This product was washed 3 times with 1-liter portions of cold water and 8 times with 1-liter portions of hot water. The poly(p-phenylene sulfide) product, after drying in a vacuum oven at 80° C., amounted to 59.2 g, including ash, corresponding to a 47.8% yield, excluding ash, and had an inherent viscosity of less than 0.01, a Tg of 70° C. and a Tm of 271° C.

EXAMPLE VIII

A polymerization similar to Example VI was carried out using 29.15 g (0.5 gram-mole) of $Mg(OH)_2$ substitiuted for the $Ca(OH)_2$. Dehydration for 1 hour and 35 minutes to 210° C. yielded 29 ml of distillate containing 26.0 g of water. Polymerization similar to that of Example VI at a pressure of 70–190 psig yielded a light brown product. The product was washed 3 times with 1-liter portions of cold water and 8 times with 1-liter portions of hot water and dried at 80° C. in a vacuum oven. Poly(p-phenylene sulfide) product was obtained in the amount of 65.7 g, containing 24.9% ash, corresponding to a 45.7% yield, excluding ash, and having an inherent viscosity of less than 0.01, a Tg of 57° C. and a Tm of 257° C.

EXAMPLE IX

To a stirred 1 liter autoclave were charged 83.6 g (1.0 gram-mole, 67% assay) of NaSH and 276.7 g of N-methyl-2-pyrrolidone. The dehydration (1 hour and 25 minutes to 198° C.) yielded 22 ml of distillate containing 20.0 g of water.

1,4-Dichlorobenzene (149.9 g, 1.02 gram-moles) and 50 g N-methyl-2-pyrrolidone were added, and polymerization was conducted by heating at 245° C. for 3 hours at a pressure of 100–25 psig. After opening the reactor, the product was obtained as a thick, light yellow paste.

The product was washed three times with 1-liter portions of hot water and four times with 1-liter portions of methanol.

The washed poly(p-phenylene sulfide) product, which was light gray, weighed 43.1 g, representing a 40% yield, and had an inherent viscosity of 0.03 and a PMT of 253° C.

Thus, the percent yield of poly(p-phenylene sulfide) in each of Examples I-VIII, inclusive with the exception of Example V, was greater than that in Example IX, a run in which an applicable base as defined herein was not employed. Examples V and IX represent runs outside the scope of this invention.

It is within the scope of the invention to bring the polyhalo-substituted aromatic compound, the alkali metal bisulfide, the base and the organic amide into contact in any order.

Also, it is within the scope of this invention to remove water from any combination of the aforesaid compounds.

It will be evident from the foregoing that various modifications can be made to the method of this invention. Such are considered, however, to be within the scope thereof.

What is claimed is:

1. A method of producing a polymer which comprises:
   a. forming a composition by contacing at least one polyhalo-substituted aromatic compound wherein the halogen atoms are attached to aromatic ring carbon atoms, at least one base selected from the hydroxides of magnesium, calcium, strontium and barium and the carbonates of sodium, potassium, rubidium and cesium, at least one organic amide and at least one alkali metal bisulfide selected from bisulfides of lithium, sodium, potassium, rubidium and cesium; and,
   b. maintaining at least a portion of said composition at polymerization conditions to produce said polymer.

2. The method of claim 1 in which said polyhalo-substituted aromatic compound is employed in an amount within the range of from about 0.9 to about 2 gram-moles per gram-mole of alkali metal bisulfide.

3. The method of claim 1 in which said base is employed in an amount within the range of from about 0.3 to about 4 gram-equivalents per gram-mole of alkali metal bisulfide.

4. The method of claim 2 in which said organic amide is employed in an amount within the range of from about 100 grams to about 2,500 grams per gram-mole of polyhalo-substituted aromatic compound.

5. The method of claim 1 in which said polyhalo-substituted aromatic compound is 1,4-dichlorobenzene, said organic amide is N-methyl-2-pyrrolidone, said base is sodium carbonate and said alkali metal bisulfide is sodium bisulfide.

6. The method of claim 1 in which said polyhalo-substituted aromatic compound is 1,4-dichlorobenzene, said organic amide is N-methyl-2-pyrrolidone, said base is potassium carbonate and said alkali metal bisulfide is sodium bisulfide.

7. The method of claim 1 in which said polyhalo-substituted aromatic compound is 1,4-dichlorobenzene, said organic amide is N-methyl-2-pyrrolidone, said base is calcium hydroxide and said alkali metal bisulfide is sodium bisulfide.

8. The method of claim 1 in which said polyhalo-substituted aromatic compound is 1,4-dichlorobenzene, said organic amide is N-methyl-2-pyrrolidone, said base is magnesium hydroxide and said alkali metal bisulfide is sodium bisulfide.

9. The method of claim 1 in which water is removed from said composition prior to maintaining said composition at polymerization conditions.

10. A method of producing a polymer which comprises:
    a. contacting at least one organic amide, at least one alkali metal bisulfide selected from bisulfides of lithium, sodium, potassium, rubidium and cesium and at least one base selected from the hydroxides of magnesium, calcium, strontium and barium and the carbonates of sodium, potassium, rubidium and cesium to form a first composition;
    b. contacting at least a portion of said first composition with at least one polyhalo-substituted aromatic compound wherein the halogen atoms are attached to aromatic ring carbon atoms to form a second composition; and,
    c. maintaining said second composition at polymerization conditions to form said polymer.

11. The method of claim 10 in which said polyhalo-substituted aromatic compound is employed in an amount within the range of from about 0.9 to about 2 gram-moles per gram-mole of alkali metal bisulfide.

12. The method of claim 10 in which said base is employed in an amount within the range of from about 0.3 to about 4 gram-equivalents per gram-mole of alkali metal bisulfide.

13. The method of claim 11 in which said organic amide is employed in an amount within the range of from about 100 grams to about 2,500 grams per gram-mole of polyhalo-substituted aromatic compound.

14. The method of claim 10 in which said polyhalo-substituted aromatic compound is 1,4-dichlorobenzene, said organic amide is N-methyl-2-pyrrolidone, said base is sodium carbonate and said alkali metal bisulfide is sodium bisulfide.

15. The method of claim 10 in which said polyhalo-substituted aromatic compound, is 1,4-dichlorobenzene, said organic amide is N-methyl-2- pyrrolidone, said base is potassium carbonate and said alkali metal bisulfide is sodium bisulfide.

16. The method of claim 10 in which said polyhalo-substituted aromatic compound is 1,4-dichlorobenzene, said organic amide is N-methyl-2-pyrrolidone, said base is calcium hydroxide and said alkali metal bisulfide is sodium bisulfide.

17. The method of claim 10 in which said polyhalo-substituted aromatic compound is 1,4-dichlorobenzene, said organic amide is N-methyl-2-pyrrolidone, said base is magnesium hydroxide and said alkali metal bisulfide is sodium bisulfide.

18. The method of claim 10 in which water is removed from said first composition prior to maintaining said second composition at polymerization conditions.

* * * * *